United States Patent

Telco

[11] Patent Number: 5,285,052
[45] Date of Patent: Feb. 8, 1994

[54] CONTROL OF ELECTRICALLY OPERATED HEATING SYSTEMS

[75] Inventor: Paul Telco, Hatfield, United Kingdom

[73] Assignee: British Technology Group Limited, London, England

[21] Appl. No.: 602,274

[22] PCT Filed: Feb. 6, 1990

[86] PCT No.: PCT/GB90/00177
§ 371 Date: Nov. 9, 1990
§ 102(e) Date: Nov. 9, 1990

[87] PCT Pub. No.: WO90/08995
PCT Pub. Date: Aug. 9, 1990

[30] Foreign Application Priority Data
Feb. 6, 1989 [GB] United Kingdom ............ 8902580

[51] Int. Cl.$^5$ .............................................. H05B 1/02
[52] U.S. Cl. .................................. 219/483; 219/485; 219/486; 219/494; 219/501; 307/38; 307/40
[58] Field of Search .............. 219/494, 497, 499, 501, 219/505, 483–486; 307/38–41

[56] References Cited

U.S. PATENT DOCUMENTS

| | | | |
|---|---|---|---|
| 4,160,153 | 7/1979 | Melander | 219/485 |
| 4,168,491 | 9/1979 | Phillips et al. | 307/41 |
| 4,216,384 | 8/1980 | Hurley | 307/41 |
| 4,920,252 | 4/1990 | Yoshino | 219/497 |

FOREIGN PATENT DOCUMENTS

| | | |
|---|---|---|
| 0223663 | 5/1987 | European Pat. Off. |
| 1905069 | 8/1970 | Fed. Rep. of Germany. |
| 2145740 | 2/1973 | France. |
| 2321096 | 3/1977 | France. |
| 2401452 | 3/1979 | France. |

Primary Examiner—Mark H. Paschall
Attorney, Agent, or Firm—Cushman, Darby & Cushman

[57] ABSTRACT

An electrically operable heating system which comprises a plurality of heating units has one or more control units for controlling the operation of each heating unit. Each control unit operates on the basis of two input signals (F) and (P). One (F) represents the maximum proportion of the power of the associated heating unit or units which can be made available at any time and the other (P) represents the fraction of that proportion required at a particular time. Also disclosed is a system in the switching of heater units is carried out in a random manner.

17 Claims, 2 Drawing Sheets

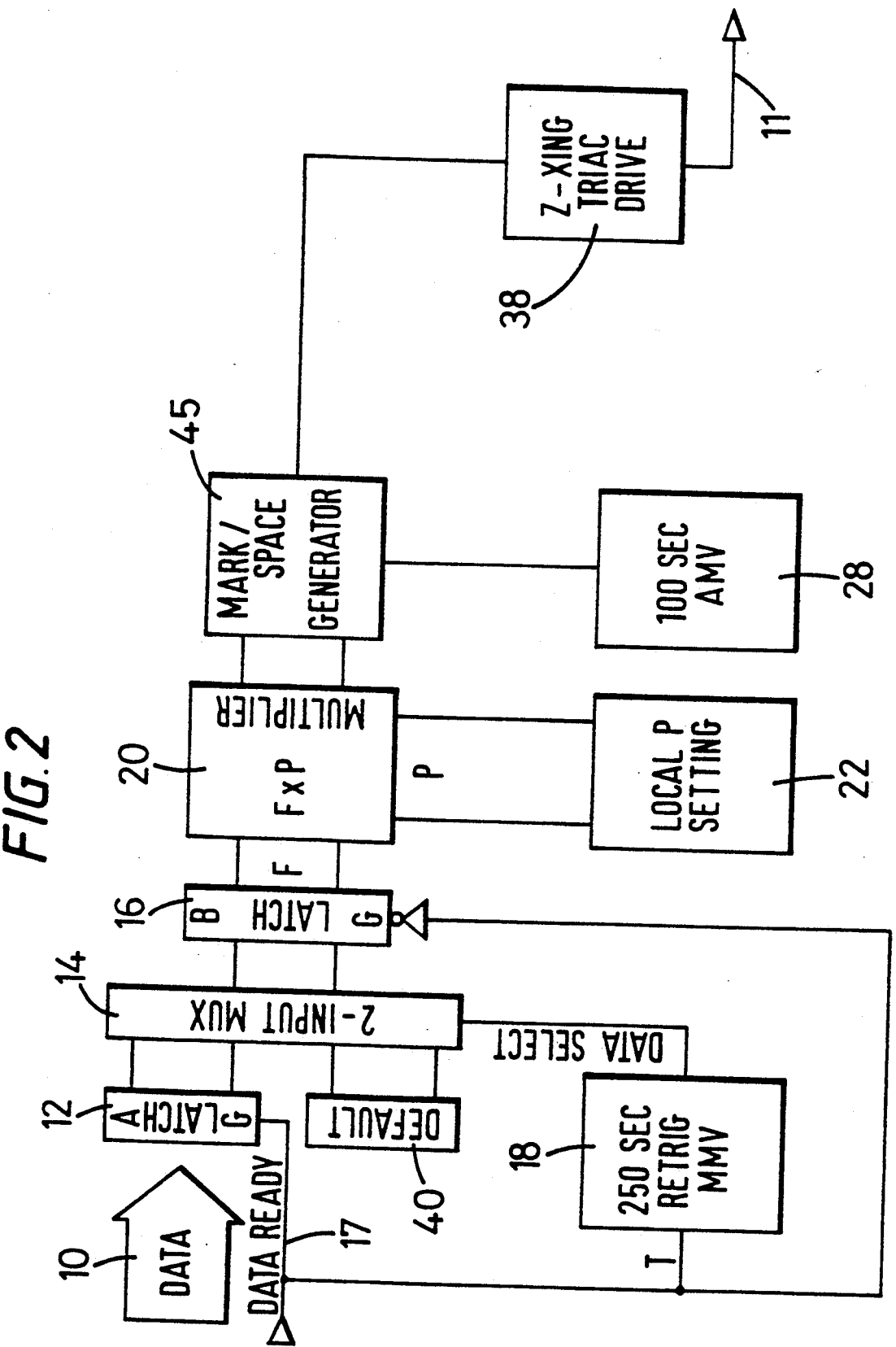

CONTROL OF ELECTRICALLY OPERATED HEATING SYSTEMS

TECHNICAL FIELD

This invention relates to the control of electrically operated heating systems.

PRIOR ART

Conventional arrangements for space heating by electrically operated heaters require some means of control so as to maintain the temperature within the space at or within defined temperature limits. Desirably the control means should ensure that economical use is made of the available power. The better the temperature control the closer the upper and lower temperature limits can be and hence the smaller the power consumption.

It is conventional to employ thermostats as a means of control, but this is not entirely satisfactory even with very accurate thermostats. This is because the accuracy of the thermostat can only make a limited contribution to the overall accuracy of the control system since its operation is influenced by other factors such as:

(1) The thermal lag of the heater/room combination.
(2) Local cooling due to, for example, draughts in the vicinity of a thermostat.
(3) The siting of the thermostat. The thermostat may not give a true reading of the space temperature. This can happen where, for example, the thermostat is mounted at a very low level and there is no simple relationship between the temperature at that level and the temperature at a higher level.
(4) The relationship between the heater capacity and the heat requirement. This relationship can vary according to the prevailing weather and any discrepancy aggravates particularly the affect "(1)" described above.

All the above factors tend to make conventional control of electrically operated heating systems inefficient.

SUMMARY OF INVENTION

The present invention proposes a control for an electrically operated heating system in which the control operates on the basis of two adjustable input parameters, one of which represents the maximum proportion P of the power of a heater or group of heaters which can be made available under any circumstances and the other of which represents the fraction F of that proportion which is to be used at any particular time. By using a control of this form, it is possible to match more precisely the heat input for a space to the heat losses of that space.

Another aspect of the present invention is concerned with a safety feature in which if a communication link to the control of a heater is sensed to be faulty, the control assumes a state in which heat output is reduced to a predefined acceptable level or cut off completely. In addition an alarm signal may be generated.

A still further aspect of the present invention concerns the timing of the switching on and off of the electrically operated heaters which make up the system. The control system makes use of free running oscillators which control the switching on and off of the individual heaters. Each heater has its own oscillator which produces an output whose timing is independent of the other oscillator so that the switching on and off of the various heaters will not be synchronised. This has the effect of reducing the probability of large fluctuations in loading of the electrical supply.

BRIEF DESCRIPTION OF DRAWINGS

The invention will be described now by way of example only, with particular reference to the accompanying drawings. In the drawings:

FIG. 2 is a schematic diagram similar to FIG. 1 showing a modified form of control circuit.

DESCRIPTION OF PREFERRED EMBODIMENTS

Figure 1:
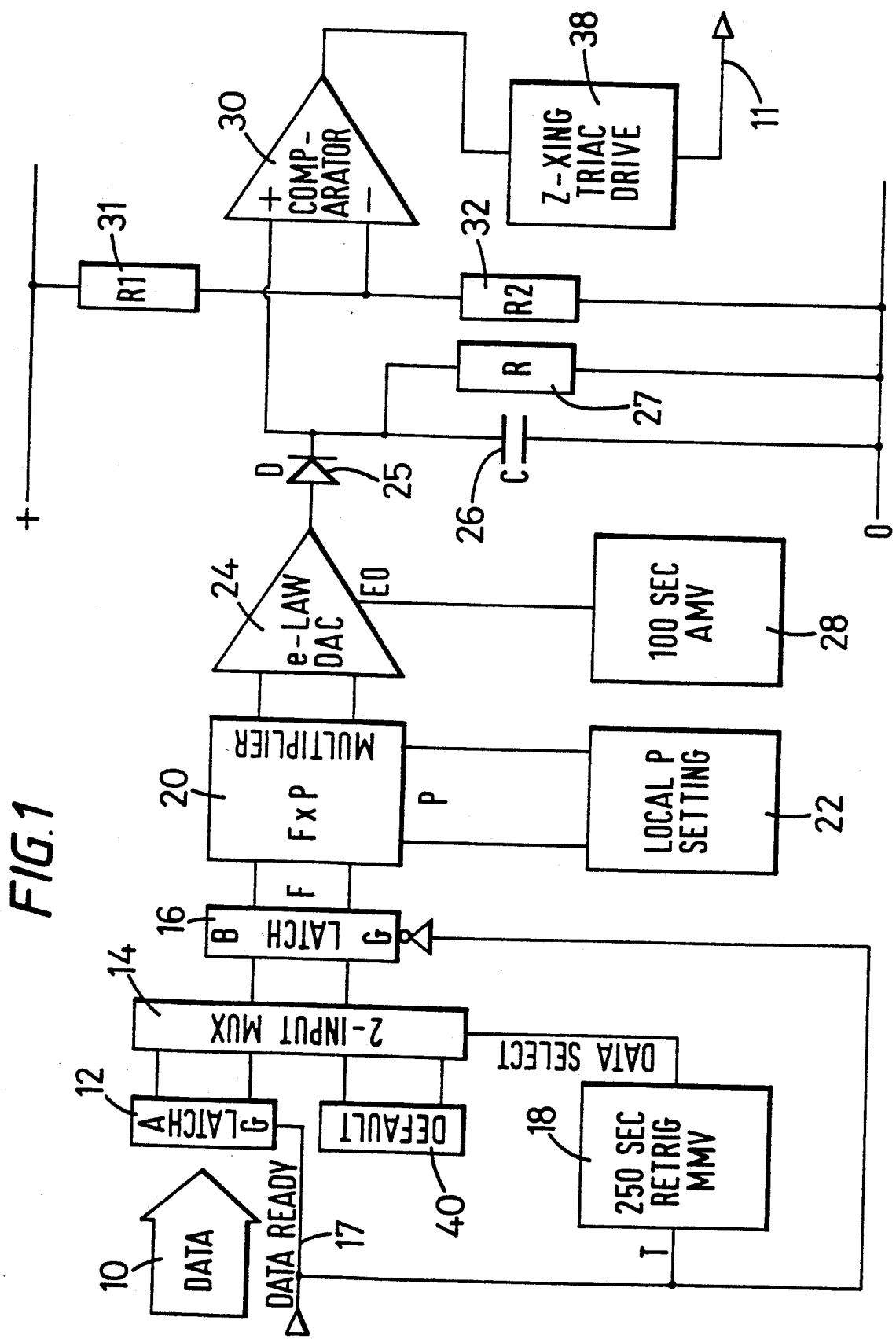
FIG. 1 is a block schematic diagram showing a control circuit for use in a system in accordance with the present invention.

In FIG. 1, the circuit has an input, shown generally at (10), for data supplied from a remote central control unit. This data represents a parameter (F) which is the fraction of the heater capacity required at a particular time. The fraction is based upon some sensed parameter or parameters such as, for example, the sensed temperature external to the space being heated and previously collected data. The circuit shown in the drawing also includes an output (11) which is connected to an electrically operated heater forming part of the space heating system.

The data on input (10) is fed to a latch (12) and can be transferred to a latch (16) via a two-input multiplexer (14). The operation of the latches (12 and 16) is controlled by a data ready signal on line (17) which is presented whenever valid data is ready for transfer from the communication link carrying the data (F) correctly to data input 10. The data ready signal is also applied to a retriggerable monostable multivibrator (18) whose output is connected to the multiplexer (14). The latch (16) feeds a multiplier (20) which also receives an input from a local setting circuit (22). This circuit is designed to supply a signal (P) which is indicative of the maximum fraction of the power of a heater or group of heaters which can be made available at any time. The multiplier (20) multiplies the parameters (F and P) and supplies an output to a digital-to-analogue converter (24) which has an exponential characteristic. The output of the digital-to-analogue converter (24) is fed by a diode (25) to a capacitor (26) which has a time constant determined by the capacitance of that capacitor and a resistor (27) connected in parallel therewith. The exponential characteristic of the analogue-to-digital converter (24) typically is designed to match a selected 100 second portion of the decay of the capacitor resistor network. A 100 second astable multivibrator (28) is arranged to strobe the output of the digital-to-analogue converter so as to produce a pulse output for charging the capacitor.

The RC network of capacitor (26) and resistor (27) is connected to the non-inverting input of a comparator (30), the other input of which is connected to the junction of two resistors (31 and 32). The output of the comparator (30) is connected to a zero crossing Triac drive (38) which controls energisation of an electrically operated heater or group of heaters which forms part of the overall heating system.

The circuit shown in the drawing operates to energise the heater or group of heaters for a period of time which depends upon the product of (F) and (P). The data corresponding to (F) from the central control is multiplied by the fraction (P) which can be set locally and this is presented to the digital-to-analogue converter (24). The free running astable multivibrator (28)

strobes the output of the digital-to-analogue converter (24) to produce a pulse output which charges the capacitor (26). This produces a pulse of particular amplitude and depending upon this amplitude, the capacitor then discharges through the resistor (27) in a time which varies between 0 and 100 seconds depending upon the initial amplitude. The voltage on the capacitor (27) is applied to the non-inverting input of the comparator (30). The comparator (30) compares this voltage with the voltage level at the junction of resistors (31 and 32) which provides a switching threshold which is equal to the charge voltage on the capacitor 100 seconds after a full charge. When the capacitor (26) has discharged to the threshold value, the output of the comparator (30) changes from a high to a low state and remains in that low state until the capacitor is recharged on the next 100 second cycle. It will thus be seen that the triac drive will energise the heating for a period of time which depends upon the product of (F) and (P). As shown in the drawing, the value of (P) can be set locally and this is used as a means of balancing the input into the various rooms so that a correct relationship between the room temperatures is maintained. The inputs (F) of the arrangement shown can be adjusted remotely by some central control so as to maintain the desired temperature in accordance with some reference sensor or previously collected data. It will be appreciated that there are various alternatives to the way in which (F) and (P) are controlled. For example the input (P) can be set permanently whilst the input (F) may be user adjustable. Alternatively the input (P) can be set with the input (F) under remote control.

As an example for the circuit shown in the drawings, if 4-bit digital data is employed then the on time of the heater would be $$(F \div 15) \times (P \div 15) \times 100 \text{ seconds}$$

and the off time would be $$100 - [(F \div 15) \times (P \div 15)] \times 100 \text{ seconds}$$

It will be appreciated that as an alternative to the arrangements shown, the data F and P could be in analogue form and processed by an analogue multiplier with an appropriate non-linear output.

Also local thermostat inputs can be used as high and/or limit control by logically combining their outputs with the comparator output before presentation to the zero crossing triac drive (38). Alternatively they could be used to modify the characteristic of the digital-to-analogue converter (or analogue multiplier) or switching threshold so as to give smoother control.

The use of the zero crossing triac drive (38) results in the reduction or prevention of unnecessary electrical disturbance when switching the heater on or off.

The circuit shown in the drawing has a built-in safety default which operates in the event that the communication link providing the data to input (10) has a fault. It will be seen that associated with the data input is a data ready signal on line 17 which is fed to the retriggerable monostable multivibrator (18). So long as this multivibrator is regularly triggered by the data ready signal, it is prevented from resetting and therefore its output holds the data select input to the multiplexer so that the data in latch (12) can be transferred to latch (16). If the communication link should fail then the data ready signal is not present on line (17) and the monostable circuit (18) resets. The data select input then changes and a default setting from a circuit (40) is transferred to latch (16). This condition can be used to operate a warning lamp or alarm not shown on the drawing. The default value may be set by hard wiring or by selector switches. In addition the actuation of the default setting will automatically isolate the heating unit which will assume a safe condition. This condition can be any predetermined condition such as for example 25% of available output.

Once communication is re-established the monostable (18) is retriggered and data can then be accepted again so that the circuit reverts to its normal operation.

The redundancy of the system, (and thus the reliability) can be increased by raising the data repetition rate or by extending the time period of the multivibrator (18) so that more attempts can be made before the monostable resets. This feature is particularly valuable in low cost "listen-only" systems.

A further feature of the system as described is the timing of the switching on and off of the heater units which make up the overall heating system. The circuit shows the control circuit for one heater unit. As will be appreciated each heater unit or group of units has its own control circuit and hence its own astable multivibrator (28). The instant at which each astable multivibrator produces its output is essentially random and hence the instant at which each control circuit switches its associated heater unit on and off is similarly random. This has the advantage that it will avoid significant fluctuations in supply voltage which could occur if all the heater units were switched on and off at precisely the same instant. The use of free running multivibrators to strobe the digital-to-analogue converter (24) ensures that the probability of any heaters being switched simultaneously is extremely low.

A similar result could be achieved by providing an adjustable variable time delay in each heater.

In the modification shown in FIG. 2 the circuit elements (24, 25, 26, 27, 30, 31 and 32) of FIG. 1 are replaced by a mark-space generator (45). The operation of the circuit is similar to that described with reference to FIG. 1. The mark space ratio of the output of generator (45) is dependent on the output of multiplier (20) and is used to control the triac drive (38) to energise the heating for a period which depends on the product of F and P.

It will be appreciated also that other arrangements are possible which can achieve the same result. For example the processing of the signals F and P can be carried out using a suitably programmed microprocessor.

I claim:

1. An electrically operable heating system comprising:
    a plurality of heating units,
    a plurality of control units for controlling operation of at least said heating units respectively,
    each control unit including a device which provides an output based on two inputs one of which represents a preset maximum proportion of the power of the respective heating unit which can be made available at any time and the other of which represents the fraction of that proportion required at a particular time, and
    means in each control unit responsive to the respective said output for regulating the heating ON time of the respective heating unit to the exclusion of the other said heating units.

2. A heating system as claimed in claim 1, wherein said other input is generated at a central control and said system connects to a communication link which transmits said other input to each control unit.

3. A heating system as claimed in claim 1 or claim 2, wherein said one input is generated locally to each control unit.

4. A heating system as claimed in claim 1, wherein said inputs are digital signals.

5. A heating system as claimed in claim 2, wherein each control unit includes means for sensing the condition of the communication link and for isolating a unit in response to sensing of a fault on said link.

6. An electrically operable heating system comprising:
   a plurality of heating units, and
   one or more control units, each operative to control operation of a heating unit or group of heating units and including a device which operates on the basis of two inputs one of which represents the maximum proportion of the power of the associated heating unit or group of heating units which can be made available at any time and the other which represents the fraction of that proportion required at a particular time,
   wherein each control unit includes means for sensing the condition of the communication link and for isolating a unit in response to sensing of a fault on said link, and
   wherein said sensing means includes a re-triggerable multivibrator arranged to receive signals on said link, said multivibrator operating to maintain normal operation of said control unit as long as said signals are received, and to said unit to a fault condition in the absence of such signals.

7. An electrically operable heating system comprising:
   a plurality of heating units, and
   one or more control units, each operative to control operation of a heating unit or group of heating units and including a device which operates on the basis of two digital signal inputs one of which represents the maximum proportion of the power of the associated heating unit or group of heating units which can be made available at any time and the other of which represents the fraction of that proportion required at a particular time,
   wherein each control unit includes as said device multiplying means for multiplying said inputs, and in the regulating means an analogue-to-digital converter having an exponential characteristic arranged to receive the output of said multiplying means, a capacitor arranged to be charged by the output of the analogue-to-digital converter, and a comparator for comparing the voltage signal on the capacitor with a reference signal.

8. A heating system as claimed in claim 7, wherein each unit includes means for strobing the output of the analogue-to-digital converter to produce pulses for periodically charging the capacitor.

9. A heating system as claimed in claim 8, wherein each control unit includes a zero crossing triac drive for energising the heating unit or group of units in response to the output of said comparator.

10. A heating system which comprises a plurality of heating units and control units for controlling each heating unit or group of units such that each heating unit or group of units is switched on and off periodically in accordance with the heat requirements of the space associated with each heating unit or group of units, each control unit being arranged to produce control signals for switching its associated heating unit or group of units at times unrelated to the times at which other control units produce their control signals.

11. A heating system as claimed in claim 10, wherein each control unit includes an astable multivibrator for generating signals which determine the times at which said heating units are switched.

12. A heating system as in claim 1 wherein said device is a multiplier for multiplying said two inputs.

13. A heating system as in claim 1 or 12 wherein a said control unit includes an analogue-to-digital converter having an exponential characteristic.

14. A heating system as in claim 1 or 12 wherein a said control unit includes a mark/space generator.

15. A heating system as in claim 1 or 12 wherein each regulating includes means for randomly switching heating units on for times determined by the output o a respective said device.

16. An electrically operable heating system comprising:
    heating means, and
    control means for controlling operation of said heating means on the basis of two inputs P and F, P representing a preset maximum proportion of the power of said heating means which can be made available at any time and F representing the fraction of that proportion required at a particular time,
    said control means including means for multiplying P and F to produce a produce output, and
    means for converting said product output to a time based signal for regulating said heating means as to heating ON time.

17. An electrically operable heating system comprising:
    a heater, and
    control means for controlling heating ON time of said heater based on a fraction required at a particular time of a preset maximum proportion of the power of said heater which can be made available at any time.

* * * * *